United States Patent [19]

Beech et al.

[11] Patent Number: 4,778,982
[45] Date of Patent: Oct. 18, 1988

[54] SYSTEM FOR ENTERING INTEGRATED DATA ON THE FACE OF AN INTEGRATED CHIP CARD

[75] Inventors: Brian Beech, Bloomington; Jeff Rust, Brooklyn Park; Alan Meilach, Prior Lake; Rod LeVasseur, Lakeville, all of Minn.

[73] Assignee: Data Card Corporation, Minneapolis, Minn.

[21] Appl. No.: 842,937

[22] Filed: Mar. 24, 1986

[51] Int. Cl.⁴ .............................................. G06F 15/20
[52] U.S. Cl. ..................................... 235/375; 235/441; 235/492
[58] Field of Search ............... 235/441, 442, 445, 492, 235/475, 375

[56] References Cited

U.S. PATENT DOCUMENTS

| | | |
|---|---|---|
| 3,435,168 | 3/1969 | Cooney .......................... 235/441 X |
| 3,591,773 | 7/1971 | Collier et al. ................... 235/442 X |
| 3,938,662 | 2/1976 | Ernst et al. ..................... 235/475 X |
| 4,106,062 | 8/1978 | Foote .............................. 235/449 X |
| 4,166,574 | 9/1979 | Yokoyama . |
| 4,518,853 | 5/1985 | Gabel et al. . |
| 4,519,600 | 5/1985 | Warwick et al. . |
| 4,602,351 | 7/1986 | Shimamura et al. ........... 235/441 X |
| 4,612,436 | 9/1986 | Okada ............................ 235/492 X |
| 4,701,600 | 10/1987 | Beech et al. . |

Primary Examiner—David L. Trafton
Attorney, Agent, or Firm—Merchant, Gould, Smith, Edell, Welter & Schmidt

[57] ABSTRACT

A system for entering initializing data on an integrated chip card in which a pattern of contacts for transferring data in and out of the integrated chip card are on a face of the card.

15 Claims, 2 Drawing Sheets

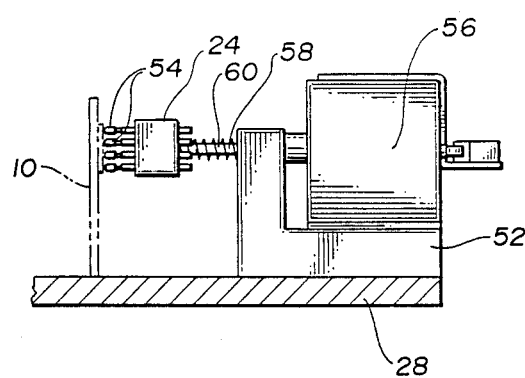
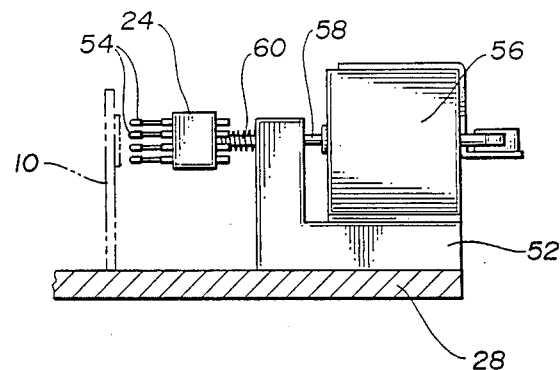
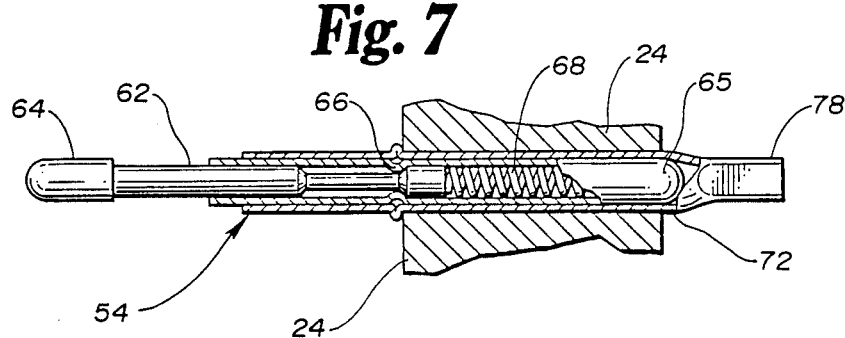
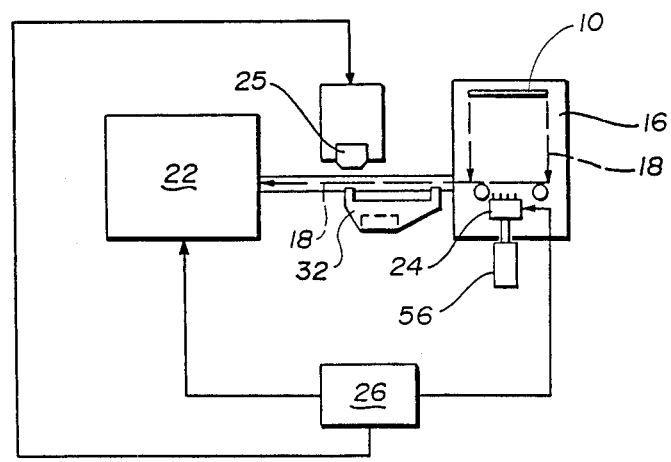

SYSTEM FOR ENTERING INTEGRATED DATA ON THE FACE OF AN INTEGRATED CHIP CARD

BACKGROUND OF THE INVENTION

This invention relates to an apparatus for programming integrated chip cards; that is, thin cards which have embedded therein a microprocessor and an associated memory which can be accessed through contacts on the surface of the card. More particularly, it relates to the apparatus for entering data through contacts on the front face of the card as a concomitant step in an over-all process of entering initializing data on the card, including embossing the front face.

As will be appreciated by those skilled in the art, over the past several years, technology has advanced to the point where it is practical to embed a microprocessor and memory chips in cards for use by individuals. These cards are usually plastic; so-called credit cards being one common example. However, it should be noted that the integrated chip card has many additional applications, not all of which are financially related. In these cards, the microprocessor contacts are flush with the surface of the card so that data may be entered, altered, and retrieved from the memory. In initializing the card, certain data peculiar to an individual or an application must be entered into the microprocessor memory and this must be consistent with various other data encoded on the card during the initialization process, including data embossed on the card.

SUMMARY OF THE INVENTION

An object of this invention is the provision of an apparatus and system in which data is initially entered into the microprocessor memory as a concomitant step in an over-all process of initial data entry on the card including embossing data on the card. Another object of the invention is to provide a system which is relatively lowcost, simple, and reliable in its operation.

Briefly, this invention, contemplates the provision of a system in which integrated chip cards are moved automatically along a predetermined path to or from card data entry stations such as card embossing apparatus. A retractable head along the path carries spring-loaded pins which, in the extended position of the head, engage contacts on the front face of the card to transfer data to the microprocessor. In the retracted position of the head, the pins are clear of the card allowing it to be moved along the path.

BRIEF DESCRIPTION OF THE DRAWINGS

FIG. 2 is a schematic diagram of an over-all system for initializing the microprocessor and embossing a integrated chip card in accordance with the teachings of this invention;

FIG. 5 is a partial side elevation of the head shown in FIGS. 3 and 4, with the head in its extended position;

FIG. 6 is another partial side elevation similar to FIG. 5 with the head in its retracted position; and FIG. 7 is a detail view with parts in section of a pin contact.

DETAILED DESCRIPTION OF THE PREFERRED EMBODIMENTS

Figure 1:
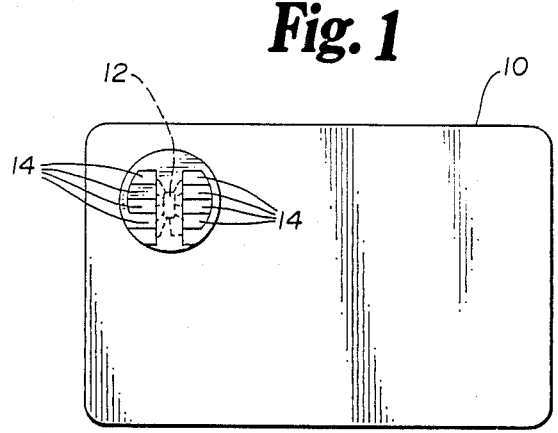
FIG. 1 is a pictorial view of the front face of integrated chip card showing the microprocessor contacts.
Figure 1A:
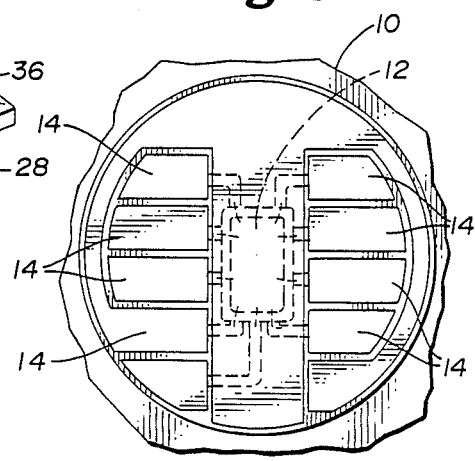
FIG. 1(a) is an enlarged detailed view of the microprocessor contacts shown in FIG. 1.

Referring now to FIGS. 1 and 1(a), a integrated chip card 10 has a microprocessor and memory 12 embedded therein shown in phantom. A series of contacts 14 flush with the surface of the card allow data to be read into and read out of the integrated chip card both during the initialization process and in use. The contacts 14 on the card shown in FIGS. 1 and 1(a) are accessible on a front face of the card. That is, the side of the card on which the characters are raised after the embossing process.

Referring now to FIG. 2, the major elements in this illustrative embodiment of the invention comprised an input magazine 16, a path 18 along which the cards move, and an embossing apparatus 22. A retractable head 24 is disposed adjacent to the path 18. This particular embodiment includes head 25 for writing and reading data on a magnetic stripe (not shown) on the rear face of the card. A card transfer shuttle 32 movings the cards along a portion of the predetermined path 18 between the head and the embossing unit.

The magazine 16 may be constructed in accordance with the teachings of U.S. Pat. No. 4,519,600 assigned to the assignee of this invention and incorporated herein by reference. The embosser 22 may also be constructed in accordance with the teaching of this U.S. Pat. No. 4,519,600.

The apparatus for reading and writing information on a magnetic stripe on the card may be constructed in accordance with U.S. Pat. No. 4,518,853 also assigned to the same assignee as this invention and incorporated herein by reference. This patent also shows in detail the shuttle to translate the cards between the magazine and the embosser.

Figure 3:
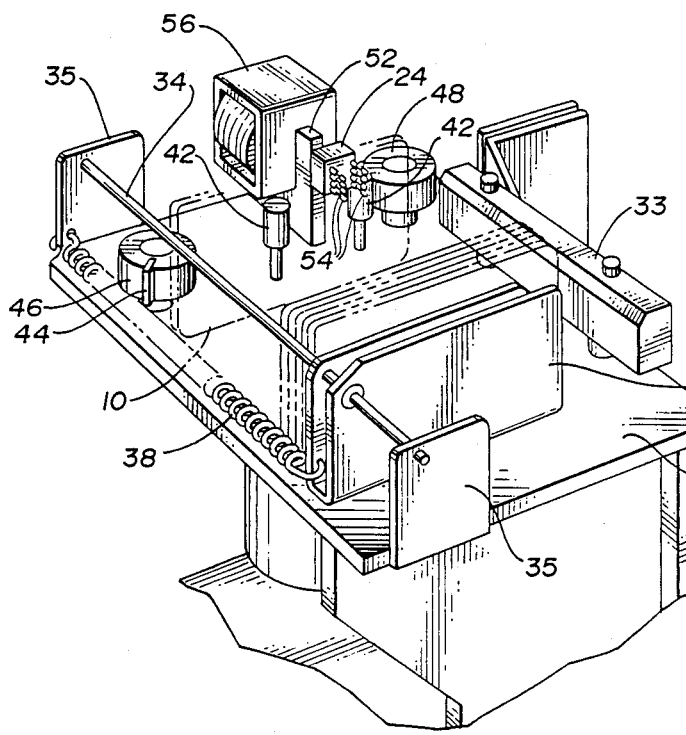
FIG. 3 is a partial perspective view showing a retractable head positioned along the card path in accordance with the teachings of this invention.
Figure 4:
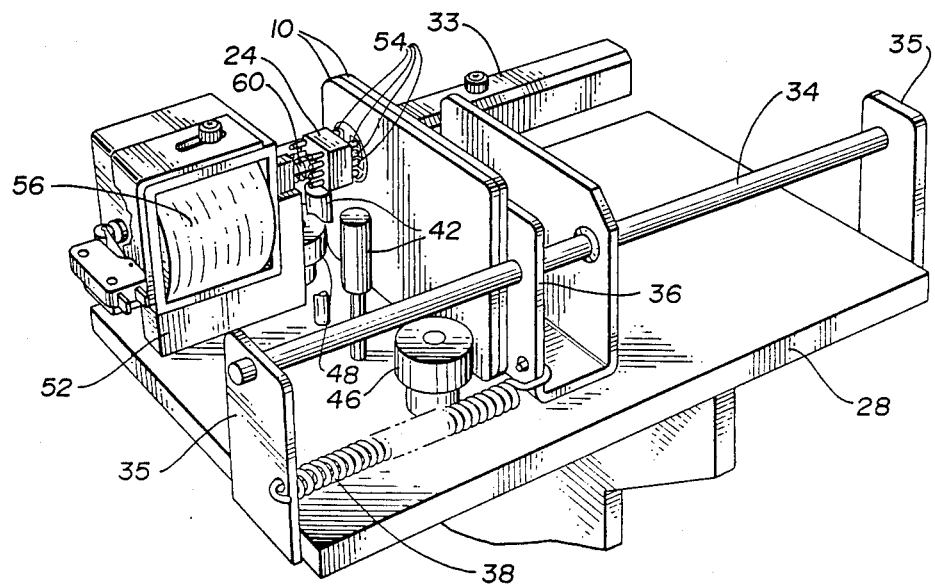
FIG. 4 is another partial perspective view of the assembly as shown in FIG. 3 as seen from a different angle.

In the embodiment shown, the sequence of operation is to first position the card next to the head 24, next to initialize the microprocessor on a card by means of the retractable head 24, then to move the card to the magnetic strip recorder and then to the embosser 22 where additional and corresponding data is embossed upon the card. A computer controller and information storage unit 26 feeds data to the head, to the magnetic strip recorder, and the embosser. It will be appreciated that the head can also read data out of the chip on the card and transfer it to the computer controller and information storage unit 26. This information read out of the card can be used for further processing and or verification or merging or the like. The data from the card may also serve to generate inputs from the controller to other data entry stations along the path 18. Referring now to FIGS. 3 and 4, the magazine includes base plate 28 supported by a frame (not shown) and a guide rail 33 to support and align a stack of integrated chip cards positioned on edge on base plate 28.

A pair of upstanding supports 35 hold a guide rod 34 along which a pusher plate 36 rides. An extension spring 38 urges the back-up plate to push the first card in the stack into contact with a pair of vertical supports 42. These supports 42 support the front of the card stack to hold it in a substantially vertical position adjacent the retractable head 24. Each of these supports has a rotatable idler mounted on a central shaft which it attached to the base to permit the top card of the stack to be driven from the stack and moved along the card transfer path 18.

Individual cards are stripped from the stack by a tab 44 which projects slightly from a rotatable picker 46. Rotation of the picker 46 forces tab 44 into a contact with the edge of the card, applying a force thereto stripping it from the stack and propelling along the card transfer path.

A wheel 48, which is driven in a counterclockwise direction as viewed from the top of the machine, provides an additional driving force to remove the card from the stack and drive it along the path.

After a card has been stripped from the stack in the magazine and started along the card transfer path, it can be engaged and moved by a card carriage as shown in the aforementioned U.S. Pat. No. 4,519,600. However, in a preferred embodiment, the card is engaged by a card transfer shuttle as shown in the U.S. Pat. No. 4,518,853, also mentioned above. The construction and operation of the magazine thus far described is substantially that shown and described in U.S. Pat. No. 4,519,600.

A bracket 52 affixed to the base 28 supports the retractable head 24 adjacent to the path along which the cards move. The head 24 carries, in this embodiment, eight resilient fingers 54 arranged in a pattern to engage respectively the eight contacts 14 on the front face of each card 10 when it has been urged against the supports 42 and before it continues moving along path 18.

The bracket 52 supports a solenoid 56 and its plunger 58. The head 24 is secured to the end of the actuator 56. A compression spring 60 biases the head 24 toward its extended position where fingers 54 engage contacts 14 when a card is against supports 42. Actuation of the solenoid retracts the head from the path of the data card.

As shown in FIG. 6, the contacts or fingers 54 each comprise a spring-loaded pin 62 with a rounded tip 64 which rides in a tube 65. An annular rib 66 limits the travel of the pin in the tube. A soft compression spring 68 urges the pin 62 forward, so that when the rounded tips of the pins engage the contacts on the front surface of the card, the pins each firmly engage a microchip contact without the critical tolerancing. The tube 64 in press fit in a sleeve 72 on the sleeve is secured in a bore in an insulating block to comprise the head 24. Each pin has a terminal 78 extend out the back of the block for making electrical connections to the pin 62.

In operation, the magazine advances each integrated chip card in the stack towards the recording head 24 along a path parallel to the motion of the head. When a card is in position against the supports 42, a suitable sensor (not shown) indicates this situation to the control unit and it causes the solenoid 54 to be de-energized, whereby the compression spring extends the head and the resilient pins engage the contacts on the front face of the card. After contact is made, data is transferred from the control unit 26 to the card in order to initialize it. The head then retracts and the card is moved along the path to the embossing unit 22. Data corresponding to that fed to the card memory from the control unit is coupled to the embosser, and in the embodiment shown, also to the magnetic character recorder. It will be appreciated that the sequence shown here is merely illustrative, and that the sequence of data entry stations along the path 18 may be varied.

Thus, it will be appreciated that the objects of the invention have been achieved. Data is entered into the microprocessor memory of the integrated chip card as a concomitant step and an over-all process of initial data entry on the card including embossing data thereon. This is accomplished in a relatively low-cost, simple and reliable operation.

What is claimed is:

1. A system for entering initializing data on a integrated chip card in which a pattern of contacts for transferring data in and out of said integrated chip card are on a face of the card, comprising in combination:
    a magazine for holding a stack of integrated chip cards;
    means for moving each of said integrated chip cards along a predetermined path to enter data on said integrated chip card at a plurality of data entry stations;
    said moving means including means for withdrawing a integrated chip card from said stack to expose the face of the next integrated chip card in said magazine;
    a head positioned adjacent said path, said head carrying a plurality of electrically conducting contacts arranged in a pattern to engage said pattern of contacts on said integrated chip card; and
    means for moving said head between a position clear of said path and a position at which the contacts on said head engage the contacts on the face of a integrated chip card in said magazine.

2. A system for entering initializing data on a integrated chip card in which a pattern of contacts for transferring data to said integrated chip card are on a front face of the card, comprising in combination:
    a magazine for holding a stack of integrated chip cards;
    means for moving each of said integrated chip cards along a predetermined path to enter data on said integrated chip card at a plurality of data entry stations;
    said moving means including means for withdrawing a integrated chip card from said stack to expose the front face of the next card in said magazine;
    a head positioned adjacent said path, said head carrying a plurality of electrically conducting contacts arranged in a pattern to engage said pattern of contacts on said integrated chip card; and
    means for moving said head between a position clear of said path and a position at which the contacts on said head engage the contacts on the front face of a integrated chip card.

3. A system for entering initializing data on a integrated chip card in which a pattern of contacts for transferring data to said integrated chip card are on a front face of the card, comprising in combination:
    a magazine for holding a stack of integrated chip cards;
    means for moving each of said integrated chip cards along a predetermined path;
    said moving means including means for withdrawing a integrated chip card from said stack to expose the front face of the next card in said magazine;
    a head positioned adjacent said path, said head carrying a plurality of electrically conducting contacts arranged in a pattern to engage said pattern of contacts on said integrated chip card; and
    means for moving said head between a position clear of said path and a position at which the contacts on said head engage the contacts on the front face of a integrated chip card in said magazine.

4. A system for entering initializing data on a integrated chip card as in claim 1 wherein said electrically conducting contacts are resilient pins.

5. A system for entering initializing data on a integrated chip card as in claim 2 wherein said electrically conducting contacts are resilient pins.

6. A system for entering initializing data on a integrated chip card as in claim 3 wherein said electrically conducting contacts are resilient pins.

7. A system for entering initializing data on a integrated chip card as in claim 4 wherein said means for moving said head includes a solenoid-operated arm.

8. A system for entering initializing data on a integrated chip card as in claim 5 wherein said means for moving said head includes a solenoid-operated arm.

9. A system for entering initializing data on a integrated chip card as in claim 6 wherein said means for moving said head includes a solenoid-operated arm.

10. A system for entering initializing data on a integrated chip card as in claim 1 wherein said plurality of data entry stations includes means for embossing said integrated chip cards.

11. A system for entering initializing data on a integrated chip card as in claim 2 wherein said plurality of data entry stations includes means for embossing said integrated chip cards.

12. A system for entering initializing data on an integrated chip card in which a pattern of contacts for transferring data in and out of said integrated chip card are on a face of the card, comprising in combination:
   a magazine for holding a stack of integrated chip cards;
   means for moving each of said integrated chip cards along a predetermined path;
   said moving means including means for withdrawing an integrated chip card from said stack;
   a head positioned adjacent said path, said head carrying a plurality of electrically conducting contacts arranged in a pattern to engage said pattern of contacts on said integrated chip card; and
   means for engaging the contacts on said head with the contacts on the face of an integrated chip card.

13. A system for entering initializing data on an integrated chip card as in claim 12, wherein said means for engaging includes means for moving said head between a position clear of said path and a position at whicn the contacts on said head engage the contacts on the face of the integraged chip card.

14. A system for entering initializing data on an integrated chip card as in claim 12, further including a plurality of data entry station means for entering data on said integrated chip cards.

15. A system for entering initializing data on an intergrated chip card as in claim 12, wherein said means for engaging includes means for engaging the contacts on said head with the contacts of an integrated chip card in said magazine.

* * * * *

UNITED STATES PATENT AND TRADEMARK OFFICE
CERTIFICATE OF CORRECTION

PATENT NO. : 4,778,982

DATED : October 18, 1988

INVENTOR(S) : Beech et al.

It is certified that error appears in the above-identified patent and that said Letters Patent is hereby corrected as shown below:

Cover page, In the Title, "INTEGRATED" (1st occurrence) should be --INITIALIZING--.
Cover page, References Cited, Line 3, "Ernst et al." should be --Ernst, Jr. et al.--.
Col. 1, In the Title, "INTEGRATED" (1st occurrence) should be --INITIALIZING--.
Col. 1, Line 40, "lowcost" should be --low cost--.
Col. 1, Line 53, after "face of" insert --an--.
Col. 2, Line 18, "comprised" should be --comprises--.
Col. 2, Line 24, "movings" should be --moves--.
Col. 2, Line 55, After "18", begin new paragraph.
Col. 3, Line 44, "in" should be --is--.
Col. 3, Line 45, "on" should be --and--.
Col. 6, Line 18, "whicn" should be --which--.
Col. 6, Line 20, "integraged" should be --integrated--.
Col. 6, Lines 25-26, "intergrated" should be --integrated--.

Signed and Sealed this

Eleventh Day of July, 1989

*Attest:*

DONALD J. QUIGG

*Attesting Officer*    *Commissioner of Patents and Trademarks*